(12) United States Patent
Mori

(10) Patent No.: US 8,983,044 B2
(45) Date of Patent: Mar. 17, 2015

(54) COMMUNICATION APPARATUS

(71) Applicant: Takato Mori, Aichi (JP)

(72) Inventor: Takato Mori, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 33 days.

(21) Appl. No.: 13/962,253

(22) Filed: Aug. 8, 2013

(65) Prior Publication Data
US 2014/0043637 A1 Feb. 13, 2014

(30) Foreign Application Priority Data
Aug. 9, 2012 (JP) ................................. 2012-177446

(51) Int. Cl.
| H04M 11/00 | (2006.01) |
| G06K 15/00 | (2006.01) |
| H04N 1/00 | (2006.01) |
| H04M 11/06 | (2006.01) |
| G06F 1/32 | (2006.01) |

(52) U.S. Cl.
CPC .......... *G06K 15/406* (2013.01); *H04N 1/00891* (2013.01); *H04M 11/066* (2013.01); *G06F 1/3209* (2013.01); *G06F 1/3278* (2013.01)
USPC .................................... 379/100.01; 358/1.15

(58) Field of Classification Search
CPC .......... H04N 1/00891; H04N 1/00896; H04N 1/00885; G03G 15/5004
USPC .......... 379/100.01; 358/1.14, 1.15, 437, 434, 358/442, 443, 446
See application file for complete search history.

(56) References Cited

U.S. PATENT DOCUMENTS

| 5,528,346 | A | | 6/1996 | Kim et al. |
| 5,758,040 | A | * | 5/1998 | Ichimura et al. ............. 358/1.14 |
| 2012/0224233 | A1 | * | 9/2012 | Watanabe ...................... 358/438 |
| 2012/0327468 | A1 | * | 12/2012 | Tomoda ....................... 358/1.15 |
| 2013/0010335 | A1 | * | 1/2013 | Baba et al. .................... 358/3.01 |

FOREIGN PATENT DOCUMENTS

| JP | 7-210039 A | 8/1995 |
| JP | 2002-176520 A | 6/2002 |
| JP | 2004-112680 A | 4/2004 |

* cited by examiner

*Primary Examiner* — Stella Woo
(74) *Attorney, Agent, or Firm* — Scully, Scott, Murphy & Presser, PC

(57) ABSTRACT

A communication apparatus is provided that includes a modem configured to transition between a normal mode and a power-saving mode, a voltage variation generator configured to generate a voltage variation on a telephone line in response to a transition instruction, a communication controller configured to connect therethrough the modem with the telephone line, and to detect the voltage variation generated on the telephone line by the voltage variation generator, the communication controller being further configured to output a transition signal to cause the modem to transition from the power-saving mode to the normal mode, in response to detecting the voltage variation on the telephone line when the modem is in the power-saving mode.

7 Claims, 4 Drawing Sheets

COMMUNICATION APPARATUS

CROSS-REFERENCE TO RELATED APPLICATION

This application claims priority under 35 U.S.C. §119 from Japanese Patent Application No. 2012-177446 filed on Aug. 9, 2012. The entire subject matter of the application is incorporated herein by reference.

BACKGROUND

1. Technical Field

The following description relates to one or more techniques for a communication apparatus having an energy-saving mode.

2. Related Art

A communication apparatus (such as a facsimile machine) having an energy-saving mode has been known. In the energy-saving mode, power supply to various types of circuits such as a modem is interrupted, or an electric power supplied thereto is reduced. The communication apparatus is configured to return from the energy-saving mode in response to receiving a calling signal from a communication line. Further, the communication apparatus is configured to return from the energy-saving mode in response to accepting an entry of a return operation (such as a facsimile transmission operation and a calling operation) to cause the communication apparatus to return from the energy-saving mode.

SUMMARY

When the communication apparatus is caused to return from the energy-saving mode in response to acceptance of the return operation, in most cases, employed is such a sequence as to initially activate a CPU and subsequently cause the CPU to activate the various types of circuits such as the modem. Thus, when the various types of circuits are activated by the CPU, some circuits may be activated after being initialized in accordance with specifications of the circuits. In this case, a longer time period is required to activate the circuits than when the circuits are activated without being initialized. Consequently, a longer time period is needed for the communication apparatus to return from the energy-saving mode.

Aspects of the present invention are advantageous to provide one or more improved techniques to avoid an undesired situation where a long time period is required for a communication apparatus to return from an energy-saving mode.

According to aspects of the present invention, a communication apparatus configured to perform communication via a telephone line is provided, the communication apparatus including a modem configured to transition between a plurality of modes including, a normal mode where the modem is allowed to modulate data to be transmitted via the telephone line and demodulate data received via the telephone line, and a power-saving mode where the modem is supplied with an electric power lower than an electric power supplied in the normal mode, a voltage variation generator configured to generate a voltage variation on the telephone line in response to a transition instruction to cause the modem to transition from the power-saving mode to the normal mode, and a communication controller configured to connect with the telephone line and the modem, and to detect the voltage variation generated on the telephone line by the voltage variation generator, the communication controller being further configured to output a transition signal to cause the modem to transition from the power-saving mode to the normal mode, in response to detecting the voltage variation on the telephone line when the modem is in the power-saving mode.

According to aspects of the present invention, further provided is a communication apparatus configured to perform communication via a telephone line, the communication apparatus including a modem configured to transition between a plurality of modes including a normal mode where the modem is allowed to modulate data to be transmitted via the telephone line and demodulate data received via the telephone line, and a power-saving mode where the modem is supplied with an electric power lower than an electric power supplied in the normal mode, a main controller configured to output a control signal in response to acceptance of a transition instruction to cause the modem to transition from the power-saving mode to the normal mode, a voltage variation generator configured to generate a voltage variation on the telephone line in response to receipt of the control signal from the main controller, and a communication controller configured to connect therethrough the modem with the telephone line, and to detect the voltage variation generated on the telephone line by the voltage variation generator, the communication controller being further configured to transmit to the modem a transition signal to cause the modem to transition from the power-saving mode to the normal mode, in response to detecting the voltage variation on the telephone line when the modem is in the power-saving mode.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

<First Embodiment>
<Configuration of MFP>

Figure 1:
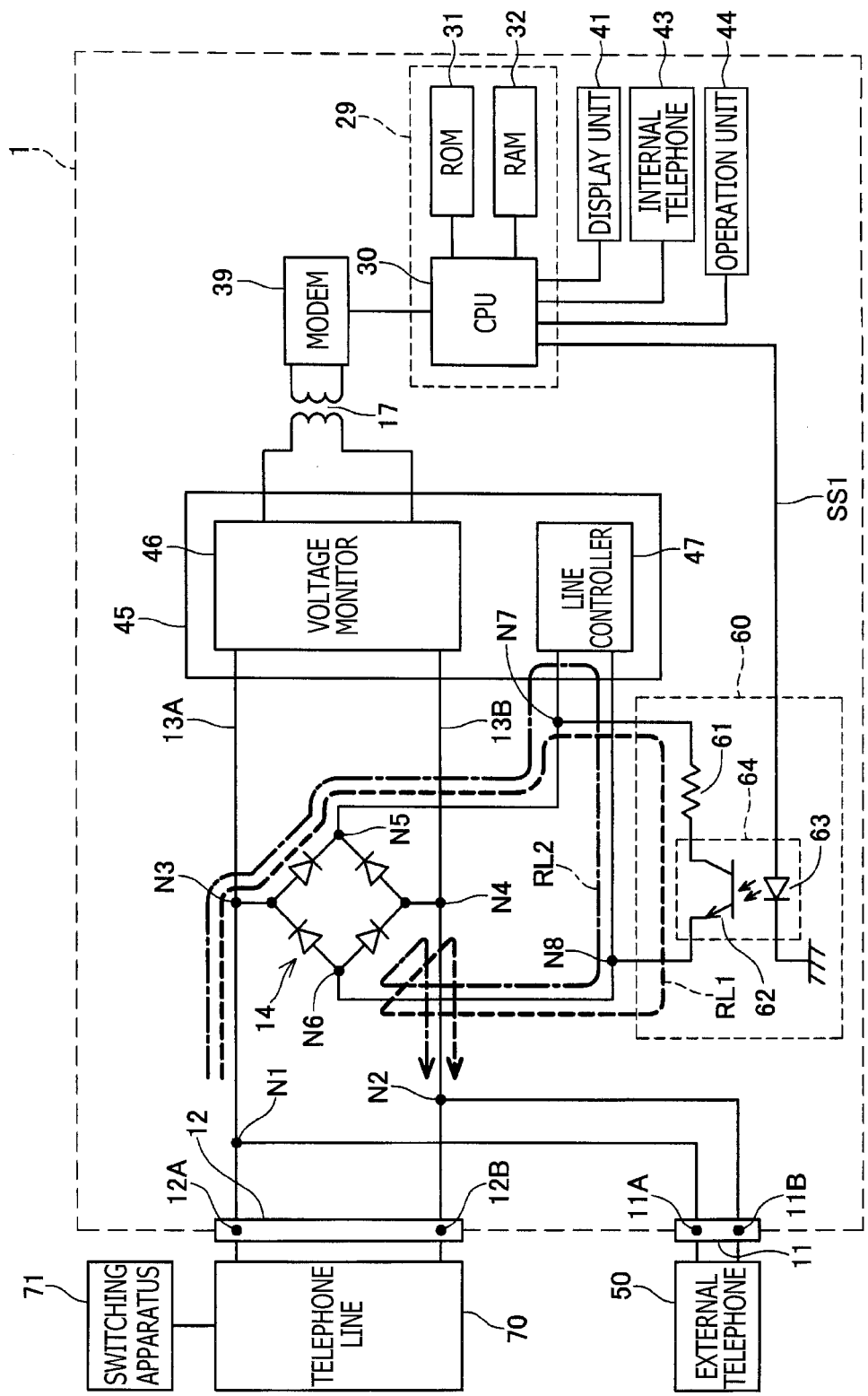
FIG. 1 is a block diagram showing a configuration of a multi-function peripheral (MFP) in a first embodiment according to one or more aspects of the present invention.

FIG. 1 is a block diagram showing a configuration of a multi-function peripheral (MFP) 1 in a first embodiment. As shown in FIG. 1, a telephone line 70 is connected with a line connection terminal 12. Further, an external telephone 50 is connected with a phone connection terminal 11. The MFP 1 is connected with a switching apparatus 71 via the telephone line 70. The telephone line 70 may include a tone dialing line using a signaling technology of dual-tone multi-frequency (DTMF), and a pulse dialing line using a signaling technology of pulse dialing.

The MFP 1 includes the phone connection terminal 11, the line connection terminal 12, a bridge circuit 14, a voltage variation generator 60, a communication controller 45, a transformer 17, a modem 39, a main controller 29, a display unit 41, an internal telephone 43, and an operation unit 44. The communication controller 45 includes a voltage monitor 46 and a line controller 47. The voltage variation generator 60 includes a resistor 61 and a photo-coupler 64. The photo-coupler 64 includes a light emitting element 63 and a light receiving element 62. The light emitting element 63 may be a photodiode. The light receiving element may be a phototransistor. The main controller 29 includes a CPU 30, a ROM 31, and a RAM 32.

The phone connection terminal 11 is configured to connect with the external telephone 50. The phone connection terminal 11 includes contact points 11A and 11B. The line connection terminal 12 is configured to connect with the telephone line 70. The line connection terminal includes contact points 12A and 12B. The phone connection terminal 11 may be configured as a modular jack (a plug-in phone jack) exposed to an outside of the MFP 1. In addition, the line connection terminal 12 may be configured as a modular jack (a plug-in phone jack) exposed to the outside of the MFP 1. The contact point 12A and the voltage monitor 46 are connected with each other via an electrical path 13A. The contact point 12B and the voltage monitor 46 are connected with each other via an electrical path 13B. The voltage monitor 46 is connected with the modem 39 via the transformer 17. The contact point 11A is connected with the electrical path 13A at a node N1. The contact point 11B is connected with the electrical path 13B at a node N2. The bridge circuit 14 is a full-wave rectifying circuit having four diodes. The bridge circuit 14 is connected with the electrical path 13A at the node N3 and connected with the electrical path 13B at the node N4. Nodes N5 and N6 of the bridge circuit 14 are connected with the line controller 47.

The voltage variation generator 60 is connected with the line controller 47 at a node N7, and connected with the line controller 47 and the node N5 via a node N8. Between the nodes N7 and N8, the resistor 61 and the light receiving element 62 are connected in series. An anode terminal of the light emitting element 63 is connected with the CPU 30 so as to receive a control signal SS1 from the CPU 30. A cathode terminal of the light emitting element 63 is connected to ground. The CPU 30 is connected with the modem 39, the ROM 31, the RAM 32, the display unit 41, the internal telephone 43, and the operation unit 44.

The photo-coupler 64 and the transformer 17 ensure electrical isolation (insulation) between first-side circuits and second-side circuits. The first-side circuits include the communication controller 45, the resistor 61, the light receiving element 62, the bridge circuit 14, and the electrical paths 13A and 13B. The first-side circuits are supplied with a first voltage of about 50 volts from the telephone line 70. The second-side circuits include the light emitting element 63, the modem 39, the main controller 29, the display unit 41, the internal telephone 43, and the operation unit 44. The second-side circuits are supplied with a second voltage lower than the first voltage, from a power supply (not shown) of the MFP 1. The second voltage may be within a range of 1.2 volts to 24 volts.

The light emitting element 63 is configured to emit light in response to receipt of a high-level control signal SS1. Thereby, the light receiving element 62 is put into an ON state to generate a first direct-current (DC) loop RL1. The first DC loop RL1 is an electrical current path running through the contact point 12A, the nodes N3, N5, and N7, the resistor 61, the light receiving element 62, the nodes N8, N6, and N4, and the contact point 12B.

The communication controller 45 is a circuit complying with direct access arrangement (DAA). The voltage monitor 46 of the communication controller 45 is configured to detect a voltage value of the telephone line 70 via the electrical paths 13A and 13B. The voltage monitor 46 makes it possible to transmit communication data from the telephone line 70 to the modem 39 via the transformer 17. Further, by the voltage monitor 46, it is possible to detect whether a line event has occurred. The line event is an event to close the telephone line 70 in response to receipt of various types of signals (such as an incoming voice communication signal and a facsimile transmission signal) from the telephone line 70. When the telephone line 70 is closed, the voltage value of the telephone line 70 is reduced. Therefore, by detecting the voltage reduction by the voltage monitor 46, it is possible to detect occurrence of the line event.

The line controller 47 of the communication controller 45 is a circuit configured to close the telephone line 70 and generate a second direct-current (DC) loop RL2. The second DC loop RL2 is an electrical current path running through the contact point 12A, the nodes N3, N5, and N7, the line controller 47, the nodes N8, N6, and N4, and the contact point 12B. The line controller 47 includes a variable resistor (not shown) disposed on the second DC loop RL2. A resistance value of the variable resistor is adjusted to maintain, at a predetermined constant value, the voltage value of the telephone line 70 detected by the voltage monitor 46. It is noted that an impedance of the voltage monitor 46 is high enough not to form a DC loop through the voltage monitor 46.

The modem 39 is a circuit configured to modulate data to be transmitted via the telephone line 70 and demodulate data received via the telephone line 70. The data modulation/demodulation may include mutual conversion between digital signals and analog signals. The modem 39 is configured to transition among three modes of a normal mode, a sleep mode, and a deep sleep mode. In the normal mode, the modem 39 is allowed to perform an operation of modulating and demodulating various types of data. In the deep sleep mode and the sleep mode, the modem 39 is supplied with an electric power lower than an electric power in the normal mode. In the deep sleep mode, the modem 39 needs the lowest power consumption. Meanwhile, in the normal mode, the modem 39 needs the highest power consumption. For instance, the power consumption in the sleep mode may be about one forth as high as the power consumption in the normal mode. Further, the power consumption in the deep sleep mode may be about one forth as high as the power consumption in the sleep mode.

An explanation will be provided about a specific example of the operation in each mode. An external clock is input into a phase locked loop (PLL, not shown) inside the modem 39. From the PLL, based on the external clock, a digital isolation barrier (DIB) clock, and an internal clock to be supplied to various types of circuits in the modem 39 are output. In the normal mode, based on the DIB clock, data communication is performed between the modem 39 and the communication controller 45 via the transformer 17. In addition, electricity is supplied from the modem 39 to the communication controller 45. In the sleep mode, a speed of the DIB clock is lowered. In the deep sleep mode, the internal clock is stopped in a state where the speed of the DIB clock is lowered. In the deep sleep mode, the DIB clock operates at a low speed. Therefore, the modem 39 is allowed to communicate with the communication controller 45. Thus, the modem 39 is allowed to receive a below-mentioned return signal from the communication controller 45 even in the deep sleep mode.

The CPU 30 of the main controller 29 is configured to control the MFP 1 based on programs stored in the ROM 31. Further, the CPU 30 contains a voltage variation controller (not shown) configured to control the voltage variation generator 60 using the control signal SS1. The Ram 32 stores various types of parameters. The display unit 41 includes a liquid crystal panel disposed on a surface of a housing (not shown) of the MFP 1. The internal telephone 43 is a phone set for voice communication previously provided to the MFP 1. The operation unit 44 includes an input device such as a numerical keypad disposed on the surface of the housing of the MFP 1.

<Return Process for Modem to Return>

Figure 2:
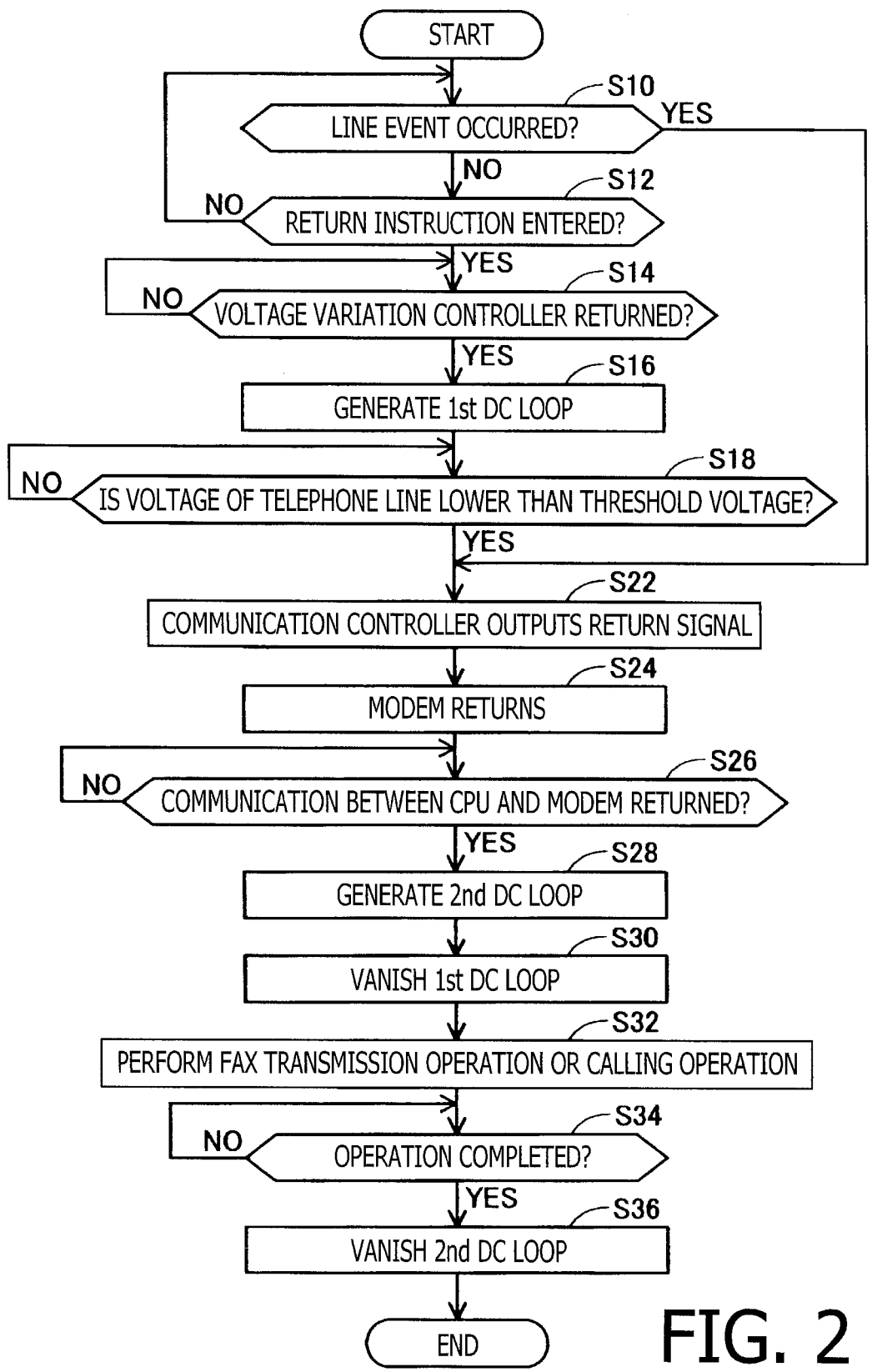
FIG. 2 is a flowchart showing a procedure of a return process for a modem to return from a deep sleep mode to a normal mode in the first embodiment according to one or more aspects of the present invention.

Referring to FIG. 2, an explanation will be provided about a return process for the modem 39 to return from the deep sleep mode to the normal mode. The below-exemplified return process is to be executed when a user inputs a return instruction through the operation unit 44. Further, the below-exemplified return process is to be executed when the voltage variation controller inside the CPU 30 is put in a sleep state.

In S10, the voltage monitor 46 determines whether the line event has occurred. Specifically, the voltage monitor 46 determines whether the voltage value of the telephone line 70 has become lower than a predetermined threshold voltage (e.g., 2 volts). When the voltage monitor 46 determines that the line event has occurred (S10: Yes), the process shown in FIG. 2 goes to S22. Meanwhile, when the voltage monitor 46 determines that the line event has not occurred (S10: No), the process goes to S12.

In S12, the CPU 30 determines whether the return instruction to cause the modem 39 to return from the deep sleep mode has been entered. The return instruction may include a facsimile transmission instruction entered via the operation unit 44 by the user. When the CPU 30 determines that the return instruction has not been entered (S12: No), the process goes back to S10. When the CPU 30 determines that the return instruction has been entered (S12: Yes), the process goes to S14.

In S14, the CPU 30 determines whether the voltage variation controller (not shown) inside the CPU 30 has returned from the sleep state. When the CPU 30 determines that the voltage variation controller has not returned from the sleep state (S14: No), the process goes back to S14, in which the CPU 30 waits for the voltage variation controller to return. Meanwhile, when the CPU 30 determines that the voltage variation controller has returned from the sleep state (S14: Yes), the process goes to S16.

In S16, the voltage variation controller inside the CPU 30 outputs a high-level control signal SS1. Thereby, the light emitting element 63 of the voltage variation generator 60 emits light, and the light receiving element 62 is put into the ON state. Hence, the first DC loop RL1 is formed, and the telephone line 70 is closed. Thus, it is possible to cause a pseudo line event on the telephone line 70. Due to voltage reduction caused by the resistor 61 on the first DC loop RL1, the voltage of the telephone line 70 is reduced to a predetermined voltage from 50 volts. The predetermined voltage is determined based on the resistance value of the resistor 61. Thus, the resistance value of the resistor 61 may be determined such that the predetermined voltage is lower than a below-mentioned threshold voltage.

In S18, the voltage monitor 46 determines whether the voltage of the telephone line 70 is lower than the threshold voltage. When the voltage monitor 46 determines that the voltage of the telephone line 70 is not lower than the threshold voltage (S18: No), the process goes back to S18. Meanwhile, when the voltage monitor 46 determines that the voltage of the telephone line 70 is lower than the threshold voltage (S18: Yes), the process goes to S22, with determination that a line event has occurred.

In S22, the communication controller 45 outputs a return signal. The return signal is transmitted to the modem 39 via the transformer 17. In S24, the modem 39 returns from the deep sleep mode to the normal mode in response to receipt of the return signal. At that time, the modem 39 returns to the normal mode without being initialized.

In S26, the CPU 30 determines whether communication with the modem 39 has returned to be available. When the CPU 30 determines that the communication with the modem 39 has not returned to be available (S26: No), the process goes back to S26, in which the CPU 30 waits for the communication with the modem 39 to return to be available. Meanwhile, when the CPU 30 determines that the communication with the modem 39 has returned to be available (S26: Yes), the process goes to S28.

In S28, the CPU 30 issues a line closing signal. The line closing signal is transmitted to the communication controller 45 via the modem 39 and the transformer 17. In response to the communication controller 45 receiving the line closing signal, the line controller 47 of the communication controller 45 closes the telephone line 70 and generates the second DC loop RL2. Namely, it is possible to generate the second DC loop RL2 under a condition that the first DC loop RL1 has been generated. Thereby, it is possible to put the telephone line 70 into a double line-closed state where the first DC loop RL1 and the second DC loop RL2 have been generated. The first DC loop RL1 and the second DC loop RL2 are mutually parallel loops with respect to the contact points 12A and 12B. Therefore, the double line-closed state is recognized by the switching apparatus 71 as being the same as a normal line-closed state where only the second DC loop RL2 has been generated.

Further, when the line controller 47 has completed the process of closing the telephone line 70, the communication controller 45 issues a line-closing completion signal. The line-closing completion signal is transmitted to the CPU 30 via the transformer 17 and the modem 39. In response to the CPU 30 receiving the line-closing completion signal, in S30, the voltage variation controller inside the CPU 30 changes the control signal SS1 from the high-level signal to a low-level signal. Thereby, the light emitting element 63 of the voltage variation generator 60 stops emitting the light, and the light receiving element 62 is put into an OFF state. Thus, the first DC loop RL1 disappears. Namely, it is possible to cause the first DC loop RL1 to disappear under a condition that the line controller 47 has generated the second DC loop RL2.

In S32, the CPU 30 performs a facsimile transmission operation or a calling operation. In S34, the CPU 30 determines whether or not the facsimile transmission operation or the calling operation has been completed. When the CPU 30 determines that the facsimile transmission operation or the calling operation has not been completed (S34: No), the process goes back to S34. Meanwhile, when the CPU 30 determines that the facsimile transmission operation or the calling operation has been completed (S34: Yes), the process goes to S36. In S36, the CPU 30 outputs a line opening signal. The line opening signal is transmitted to the communication controller 45 via the modem 39 and the transformer 17. In response to the communication controller receiving the line opening signal, the line controller 47 of the communication controller 45 opens the telephone line 70 and causes the second DC loop RL2 to disappear. Thereby, it is possible to cause the switching apparatus 71 to recognize that the telephone line 70 is in a line-open state (i.e., the telephone line 70 is open).

<Advantageous Effects of First Embodiment>

First, an explanation will be provided about a known return process for a modem to return from the deep sleep mode as a comparative example. The known return process may be launched in response to occurrence of a line event such as receipt of facsimile data or an incoming call. Alternatively, the known return process may be launched in response to an entry of a return instruction such as a facsimile transmission instruction and a calling instruction. When the known return process is launched in response to occurrence of a line event (as a trigger), a quick response to the incoming call is required. Therefore, in this case, employed is such a sequence that a communication controller, which has detected the line event, activates the modem. In this case, the modem is caused to return to the normal mode promptly without being initialized. Meanwhile, when the known return process is launched in response to an entry of a return instruction (as a trigger), a longer activation time period is provided than when the known return process is launched in response to occurrence of the line event. Therefore, in this case, employed is such a sequence as to initially activate a CPU and subsequently cause the CPU to activate the modem. When the CPU activates the modem, the modem may be activated after being initialized (the initialization may be referred to as hard reset). Further, after the initialization (hard reset) of the modem, a patch (such as a correction program or a modification program) may have to be applied to the modem. In this case, a longer time period is required for the modem to return to the normal mode than when the modem 39 is activated by the communication controller 45.

In the MFP 1 of the first embodiment, in response to the entry of the return instruction being accepted (S12: Yes), the voltage variation generator 60 generates the pseudo line event on the telephone line 70 (S16). In response to detection of the pseudo line event (S18: Yes), the communication controller 45 outputs the return signal (S22). Then, in response to the return signal from the communication controller 45, the modem 39 returns to the normal state (S24). Thereby, when the entry of the return instruction is accepted, the modem 39 is activated by not the CPU 30 but the communication controller 45. Thus, it is possible to avoid such a situation that the modem 39 is activated by the CPU 30 and that thereby a longer time period is required for the modem 39 to return to the normal state. Further, it is possible to achieve such control as to activate the modem 39 without applying any patch to the modem 39. Thus, it is possible to avoid a patch writing error caused when a patch is applied to the modem 39. Moreover, it is possible to achieve such control as to activate the modem 39 without initializing the modem 39. Thus, it is possible to achieve longer operating lives of various types of circuits, such as a non-volatile memory (not shown), provided to the modem 39.

When the second DC loop RL2 is generated after the first DC loop RL1 is caused to disappear, the voltage value of the telephone line 70 rises from the predetermined voltage to 50 volts, and again falls to the predetermined voltage. This is because the voltage value of the telephone line 70 falls to the predetermined voltage in the line-closed state where the first DC loop RL1 and the second DC loop RL2 are generated, while the voltage value of the telephone line 70 rises to 50 volts in the line-open state where none of the first DC loop RL1 and the second DC loop RL2 is generated. The changes in the voltage value of the telephone line 70 might be incorrectly detected as a single dial pulse by the switching apparatus 71. In the MFP 1 of the first embodiment, it is possible to generate the double line-closed state (S28) and to vanish the first DC loop RL1 (S30). Thereby, it is possible to switch from the first DC loop RL1 to the second DC loop RL2 while maintaining the line-closed state. Namely, it is possible to switch from the first DC loop RL1 to the second DC loop RL2 while maintaining the voltage value of the telephone line 70 at the predetermined voltage. Thus, it is possible to avoid a situation where a dial pulse is mistakenly transmitted to the switching apparatus 71.

As an installation position where the MFP 1 is installed is farther away from the switching apparatus 71, a line length of the telephone line 70 is longer, and a line resistance of the telephone line 70 is higher. When the telephone line 70 is closed by generation of the first DC loop RL1 by the voltage variation generator 60, since the resistance value of the resistor 61 is fixed, the higher the line resistance of the telephone line 70 is, the lower the voltage level detected by the voltage monitor 46 is. It might lead to an error in receiving a facsimile signal or to a lowered volume of sound in voice communication. The MFP 1 of the first embodiment is allowed to switch from the first DC loop RL1 to the second DC loop RL2 (S28 and S30). The second DC loop RL2 is generated by the line controller 47. The line controller 47 is configured to adjust the resistance value of the variable resistor on the second DC loop RL2 and control the voltage level detected by the voltage monitor 46 to be maintained at the constant value. Thus, it is possible to prevent occurrence of an error in receiving a facsimile signal.

<Second Embodiment>

Figure 3:
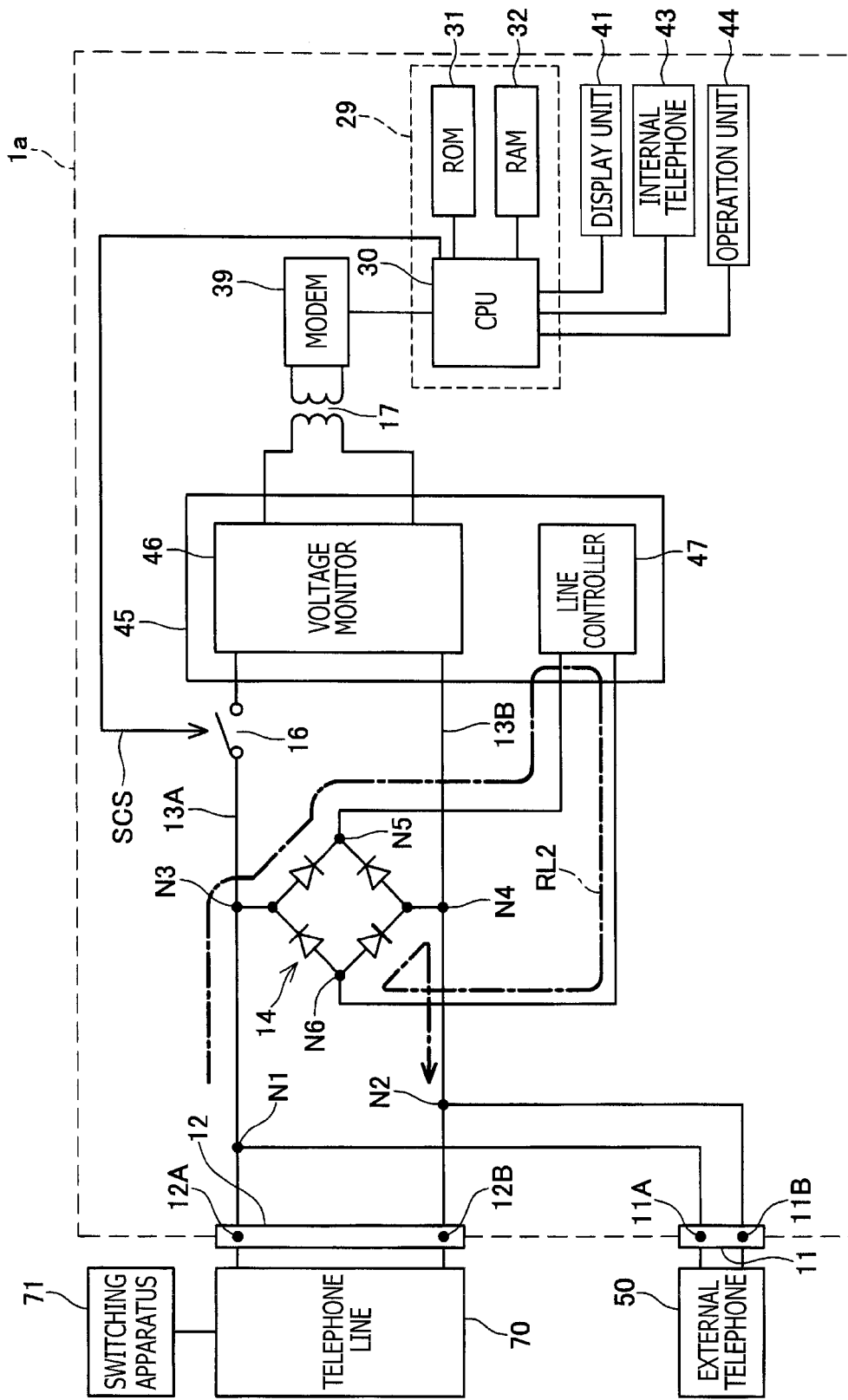
FIG. 3 is a block diagram showing a configuration of an MFP in a second embodiment according to one or more aspects of the present invention.

FIG. 3 is a block diagram showing a configuration of an MFP 1a in a second embodiment according to aspects of the present invention. The MFP 1a includes a relay 16 on the electrical path 13A for connecting the node N3 with the voltage monitor 46. The CPU 30 includes a relay controller (not shown) provided inside the CPU 30 and configured to control the relay 16. The relay controller issues a relay control signal SCS, which is transmitted to the relay 16. Since other configurations of the MFP 1a are the same as those of the MFP 1 shown in FIG. 1, explanation of the other configurations of the MFP 1a will be omitted.

<Return Process for Modem to Return>

Figure 4:
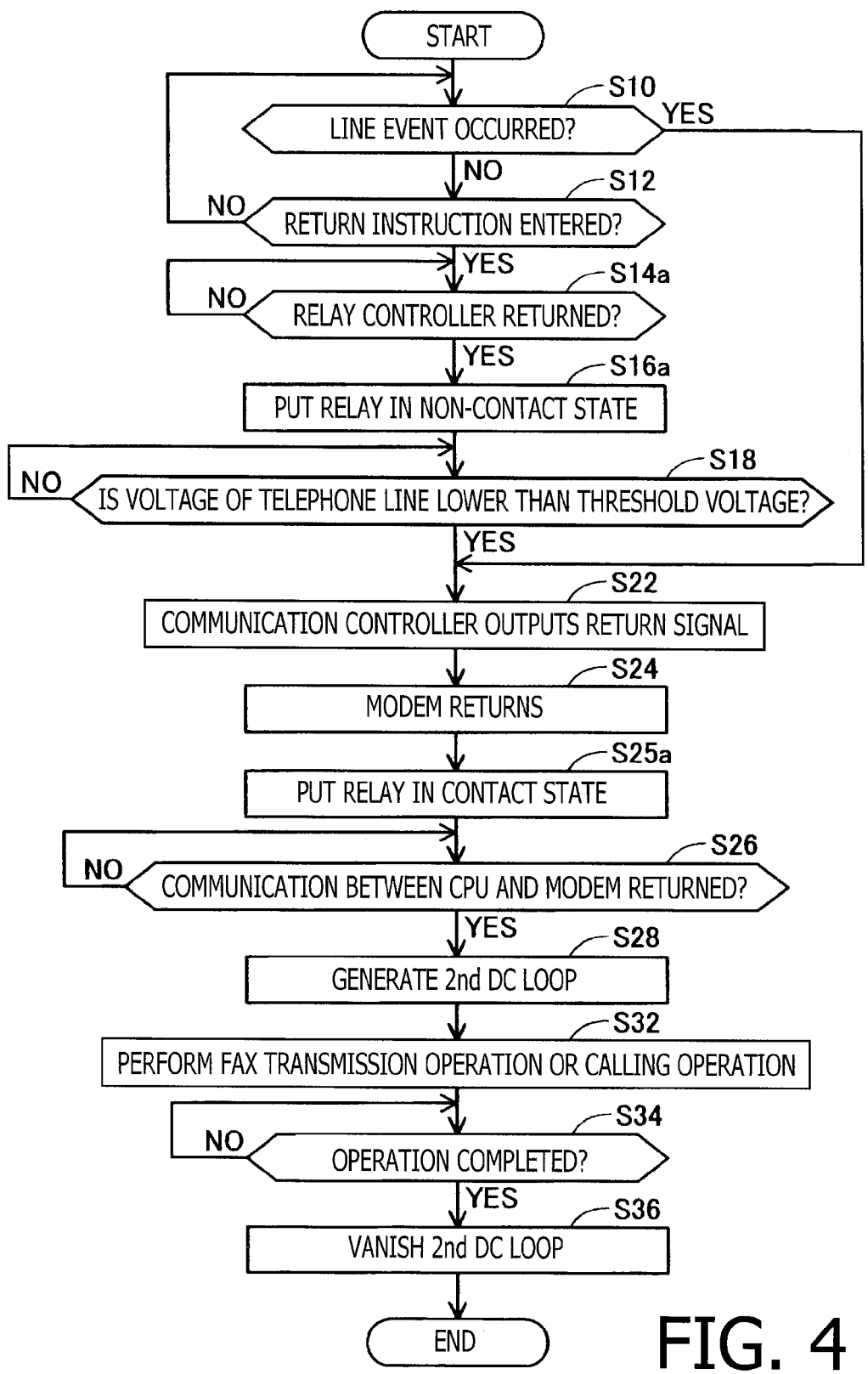
FIG. 4 is a flowchart showing a procedure of a return process for the modem to return from the deep sleep mode to the normal mode in the second embodiment according to one or more aspects of the present invention.

Referring to FIG. 4, an explanation will be provided about a return process for the modem 39 to return from the deep sleep mode to the normal mode in the second embodiment. In FIG. 4, steps, indicated by the same reference numerals as shown in FIG. 2, provide the same operations as the corresponding steps of the first embodiment in FIG. 2. Therefore, explanation of such steps will be omitted. It is noted that, in FIG. 4, steps having "a" added to the tail ends of their respective reference numerals are steps specific in the second embodiment. In the following descriptions, the steps specific in the second embodiment will mainly be described.

In S14a, the CPU 30 determines whether the relay controller (not shown) inside the CPU 30 has returned from a sleep state. When the CPU 30 determines that the relay controller has not returned from the sleep state (S14a: No), the process shown in FIG. 4 goes back to S14a, in which the CPU 30 waits for the relay controller to return from the sleep state. Meanwhile, when the CPU 30 determines that the relay controller has returned from the sleep state (S14*a*: Yes), the process goes to S16*a*.

In S16*a*, the relay controller inside the CPU 30 outputs a high-level relay control signal SCS. Thereby, the relay 16 is put into a non-contact state. Hence, the voltage monitor 46 is disconnected from the telephone line 70, and is allowed to reduce the voltage value measured by the voltage monitor 46 to 0 volt. Thus, it is possible to cause the voltage monitor 46 to detect occurrence of a line event on the telephone line 70 in a pseudo manner.

In S24, the modem 39 returns from the deep sleep mode to the normal mode in response to receipt of the return signal. In S25*a*, the relay controller inside the CPU 30 changes the relay control signal SCS from the high-level signal to a low-level signal. Thereby, the relay 16 is put into a contact state, and the voltage monitor 46 is re-connected with the telephone line 70. Thus, it is possible to cause the voltage monitor 46 to measure the voltage of the telephone line 70.

<Advantageous Effects of Second Embodiment>

In the MFP 1*a* of the second embodiment, in response to the entry of the return instruction being accepted (S12: Yes), the voltage monitor 46 is disconnected from the telephone line 70 (S16*a*). Thereby, it is possible to reduce the voltage value measured by the voltage monitor 46 to 0 volts, and thus to cause the voltage monitor 46 to detect occurrence of a line event on the telephone line 70 in a pseudo manner. Hence, when the entry of the return instruction is accepted, the modem 39 is activated by not the CPU 30 but the communication controller 45. Thus, it is possible to avoid such a situation that the modem 39 is activated by the CPU 30 and that thereby a longer time period is required for the modem 39 to return to the normal state.

When the first DC loop RL1 is generated, and a line event is caused in a pseudo manner, it is required to switch from the first DC loop RL1 to the second DC loop RL2 while maintaining the line-closed state of the telephone line 70, in order to prevent transmission of a false signal to the switching apparatus 71. Therefore, limited is a time range within which it is possible to vanish the line event caused in a pseudo manner. In the second embodiment, the MFP 1*a* is configured to cause the voltage monitor 46 to detect occurrence of the line event in a pseudo manner in the state where the voltage monitor 46 is disconnected from the telephone line 70. Since there is no influence on the electric current loops, there is no risk that a false signal might be transmitted to the switching apparatus 71. It results in no limitation to a time range within which it is possible to reconnect the voltage monitor 46 to the telephone line 70. Thus, it is possible to enhance flexibility for controlling the relay 16.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiment will be omitted.

[Modifications]

In the deep sleep mode, various methods may be applied to reduce the power consumption of the modem 39. For instance, power supply to the modem 39 may be interrupted.

In S12, various methods may be applied to determine whether the return instruction to cause the modem 39 to return from the deep sleep mode has been input. For instance, when a handset of the internal telephone 43 is picked up and put into an off-hook state, the CPU 30 may determine that the return instruction has been input.

In S16, the control signal SS1 output from the voltage variation controller inside the CPU 30 is not limited to a high-level direct-current (DC) signal. For instance, the control signal SS1 may be an alternating-current (AC) signal having a frequency different from frequencies of various signals (such as a calling signal, a CAR signal, and a dialing pulse signal) used for communication with the switching apparatus 71. For example, a frequency that is equal to or lower than 10 Hz or equal to or higher than 100 Hz may be used for the AC control signal SS1. Further, the control signal SS1 may be a signal having a voltage different from voltages of various signals used for communication with the switching apparatus 71. For example, a voltage equal to or lower than 10 volts may be used for the control signal SS1.

What is claimed is:

1. A communication apparatus configured to perform communication via a telephone line, the communication apparatus comprising:
    a modem configured to transition between a plurality of modes including:
        a normal mode where the modem is allowed to modulate data to be transmitted via the telephone line and demodulate data received via the telephone line; and
        a power-saving mode where the modem is supplied with an electric power lower than an electric power supplied in the normal mode;
    a voltage variation generator configured to generate a voltage variation on the telephone line in response to a transition instruction to cause the modem to transition from the power-saving mode to the normal mode; and
    a communication controller configured to connect with the telephone line and the modem, and to detect the voltage variation generated on the telephone line by the voltage variation generator, the communication controller being further configured to output a transition signal to cause the modem to transition from the power-saving mode to the normal mode, in response to detecting the voltage variation on the telephone line when the modem is in the power-saving mode.

2. The communication apparatus according to claim 1, wherein the voltage variation generator comprises:
    a resistor; and
    a switching unit configured to close the telephone line and generate a first direct-current loop passing through the resistor, in response to the transition instruction to cause the modem to transition from the power-saving mode to the normal mode.

3. The communication apparatus according to claim 2, further comprising a line closer configured to close the telephone line, the line closer being further configured to generate a second direct-current loop in parallel with the first direct-current loop, after the voltage variation generator has generated the first direct-current loop,
  wherein the voltage variation generator is further configured to cause the first direct-current loop to disappear after the line closer has generated the second direct-current loop.

4. The communication apparatus according to claim 2,
  wherein the resistor has a resistance determined such that a voltage value of the telephone line detected by the communication controller while the first direct-current loop is generated is lower than a predetermined threshold voltage.

5. The communication apparatus according to claim 2,
  wherein the switching unit comprises a photo-coupler comprising:
    a light emitting element configured to be supplied with a first voltage; and
    a light receiving element configured to be supplied with a second voltage higher than the first voltage, from the telephone line, and
  wherein the switching unit is configured to generate the first direct-current loop passing through the resistor and the light receiving element, in response to the transition instruction to cause the modem to transition from the power-saving mode to the normal mode.

6. The communication apparatus according to claim 1,
  wherein the voltage variation generator comprises a switching device disposed on a connection path between the telephone line and the communication controller, the switching device being configured to:
    break the connection path between the telephone line and the communication controller, in response to the transition instruction to cause the modem to transition from the power-saving mode to the normal mode; and
    form the connection path between the telephone line and the communication controller, in response to the communication controller outputting the transition signal to cause the modem to transition from the power-saving mode to the normal mode.

7. A communication apparatus configured to perform communication via a telephone line, the communication apparatus comprising:
  a modem configured to transition between a plurality of modes including:
    a normal mode where the modem is allowed to modulate data to be transmitted via the telephone line and demodulate data received via the telephone line; and
    a power-saving mode where the modem is supplied with an electric power lower than an electric power supplied in the normal mode;
  a main controller configured to output a control signal in response to acceptance of a transition instruction to cause the modem to transition from the power-saving mode to the normal mode;
  a voltage variation generator configured to generate a voltage variation on the telephone line in response to receipt of the control signal from the main controller; and
  a communication controller configured to connect therethrough the modem with the telephone line, and to detect the voltage variation generated on the telephone line by the voltage variation generator, the communication controller being further configured to transmit to the modem a transition signal to cause the modem to transition from the power-saving mode to the normal mode, in response to detecting the voltage variation on the telephone line when the modem is in the power-saving mode.

\* \* \* \* \*